United States Patent [19]
Mast, Jr. et al.

[11] Patent Number: 5,213,837
[45] Date of Patent: May 25, 1993

[54] INSTANT GRITS

[75] Inventors: John G. Mast, Jr.; Bradley J. Wiersum, both of Brentwood, Tenn.; Franz X. Ecker, Lexington, Ky.

[73] Assignee: Martha White Foods, Inc., Brentwood, Tenn.

[21] Appl. No.: 813,579

[22] Filed: Dec. 26, 1991

[51] Int. Cl.$^5$ ............................................. A23L 1/168
[52] U.S. Cl. ..................... 426/618; 426/449; 426/456; 426/620; 426/621
[58] Field of Search ............... 426/449, 621, 618, 620, 426/456

[56] References Cited

U.S. PATENT DOCUMENTS

| | | |
|---|---|---|
| 3,664,846 | 5/1972 | Hyldon . |
| 3,664,847 | 5/1972 | Hyldon . |
| 3,677,768 | 7/1972 | Mokrzycki et al. . |
| 3,787,584 | 1/1974 | Hyldon . |
| 3,792,956 | 2/1974 | Hyldon . |
| 3,974,295 | 8/1976 | Gralak . |
| 3,989,855 | 11/1976 | Jones et al. . |
| 4,006,254 | 2/1977 | Gralak . |
| 4,006,255 | 2/1977 | Gralak . |
| 4,032,668 | 6/1977 | Jones et al. . |
| 4,044,159 | 8/1977 | Lutz . |

*Primary Examiner*—Jeanette Hunter
*Assistant Examiner*—Mary S. Mims
*Attorney, Agent, or Firm*—Jacobson, Price, Holman & Stern

[57] ABSTRACT

Instant grits, which closely resembles natural grits in mouth feel, flavor and consistency, are prepared by cooking a gum-free aqueous grits slurry under controlled conditions for a limited period of time and drying the slurry rapidly prior to breaking up the obtained dried product and packaging it.

30 Claims, No Drawings

INSTANT GRITS

FIELD OF THE INVENTION

An instant food product has been prepared which more closely resembles real cook-up grits in flavor and mouth-feel than prior counterparts.

BACKGROUND

The preparation of instant grits is a rather well-developed technology. According to a simple four-step process, sodium carboxymethyl cellulose (CMC) gum and salt are premixed with water. The gum/salt/water mixture is then mixed with grits to form a slurry, which is heated by steam injection using an in-line paddle mixer. The slurry is then immediately piped to and onto a drum drier for drying and sheet formation before transporting the thus-obtained material to a mill for granulation into a final product.

The CMC gum is initially incorporated in the process for two reasons: it acts as a gel former that ties up excess water that is not absorbed by the grits (controlling the viscosity of the finished grits), and further acts as a web strengthener (facilitating removal of the dried material from the drum drier in a relatively uniform sheet for transport to the mill in a controlled manner). The gum, however, has three drawbacks: it gives the finished product a distinctive slick and slimy mouth-feel; its water-binding characteristic retards the drying process; and it is costly (over six times the cost of grits per pound).

Activity in the development of instant grits processes is reflected by patents issued in that technology. Exemplary patents include U.S. Pat. No. 3,664,846, U.S. Pat. No. 3,664,847, U.S. Pat. No. 3,787,584, U.S. Pat. No. 3,792,956, U.S. Pat. No. 3,974,295, U.S. Pat. No. 4,006,254, and U.S. Pat. No. 4,006,255, all of which initially admix corn grits with water and polysaccharide gum. The state of the art is further exemplified by such patents as U.S. Pat. No. 3,677,768 (presents a slow, tank-oriented process in which a small amount of water is added to allow some softening, granules are cracked or disrupted to speed drying and rehydration, and drying is effected slowly by air drying), U.S. Pat. No. 3,989,855 (presents a process with very high water levels, followed by slow freezing to damage or disrupt fully developed starch granules; water is removed by squeezing, followed by slow air drying), U.S. Pat. No. 4,032,668 (provides an extrusion/expansion process for making grits, followed by air drying and grinding) and U.S. Pat. No. 4,044,159 (teaches the contrast between drum drying and extrusion, followed by slicing into shakers and air drying).

SUMMARY OF THE INVENTION

A gum-free admixture of water with, e.g., one of salt, antioxidant and a sugar is mixed with grits and enough steam to heat the resulting slurry to within a predetermined temperature range and to maintain it within that range for a fixed period of time. The thus-treated slurry is then dried to obtain a solid product, which is broken up and optionally admixed with additional flavor and enrichment.

An object of this invention is to eliminate a distinctive slick or slimy mouth-feel from currently-marketed instant grits. Another object is to eliminate the use of gums, e.g. CMC gum, from compositions during preliminary heat-treating and drying steps. A further object is to reduce the cost of producing instant grits. A still further object is to eliminate from pre-drying stages water-binding components which interfere with or retard the drying process. An additional object is to eliminate a sheet-forming aid or to employ a sugar for that purpose. A further object is to develop a better tasting instant grits which more closely resembles real cook-up grits. Still further objects are apparent from the following description.

DETAILS

Instant grits are prepared by:

a) optionally premixing water with salt, antioxidant and/or a sugar to obtain a gum-free mixture;

b) admixing the gum-free mixture with raw grits (and, optionally, antioxidant, salt and/or a sugar), additional water and enough steam to heat the resulting slurry to a temperature of from 175° (preferably 180°) to 210° F. (79.5° to 96.1° C.);

c) drying the gum-free heated slurry fairly rapidly, e.g., on a double-drum drier;

d) breaking up the dried product from step (c);

e) separating excess fines; and f) as desired, dry mixing the retained dried product with such additives as additional flavor, enrichment and, optionally, dry CMC.

In step (a) or step (b) the amount of salt is generally from about 1.5 to about 2.75 (typically from about 2.1 to 2.5) percent by weight, based on the weight of raw grits. The actual amount employed is dictated by flavor; it is not an essential ingredient and thus can be omitted entirely. The salt is advantageously incorporated in a portion of the employed water prior to addition of the grits, but is alternatively added during step (b).

The antioxidant, which is optionally added during step (b), is any conventional antioxidant, such as BHA (butylated hydroxyanisole), employed in the art. The amount employed is that which is effective to serve the intended purpose. Normally, about 0.03 percent by weight, based on the weight of the grits, is adequate.

The amount of water employed in step (a) is not critical, but the total amount of water (including steam) is a significant factor with regard to the nature of the end product. The total amount of water is advantageously from about 175 to 215 (preferably 200) percent by weight, based on the weight of the raw grits.

When a sugar is employed, it is employed as a sheet-forming aid, and is preferably dextrose, which is alternatively added during step (b). From 0.45 to 0.55 (preferably about 0.53) percent by weight, based on the weight of grits, is adequate for this purpose. The 0.45 percent level is adequate to provide web integrity without adversely affecting drying output or flavor. The dextrose level can be increased significantly (to about 3 percent by weight) until the resulting product becomes difficult to dry or sticky on the drum. As little as 0.5 percent by weight of dextrose imparts a clean and slightly sweet flavor to the grits. Lower levels can be used, but greater care with cook level is required to create strong sheets that increase the drum efficiency. Higher levels increase product cost and reduce throughput. In place of dextrose, other sugars or sugar-like substances, such as granulated sugar (sucrose) and malto-dextrin, are used, individually or in any combination.

Premixing is effected, e.g., by a simple propeller mixer or in-line. The mixing mode is not critical in any way. The mixture from step (a) is pumped and metered, using, e.g., a lobe pump, to an in-line mixer employed for step (b). The raw grits can vary considerably in particle-size distribution. The normal particle size distribution is within the weight range reflected by the following table:

| | |
|---|---|
| on #14 screen | from 1 to 37 percent |
| on #20 screen | from 47 to 74 percent |
| on #25 screen | from 7 to 20 percent |
| on #30 screen | from 3 to 5 percent |
| through a #30 screen | from <1 to 5 percent. |

Exemplary particle size distributions, by weight, are shown for larger-granule and finer-granule grits, respectively, by Examples 1 and 2; Example 3 reflects an intermediate particle size distribution.

| | | |
|---|---|---|
| 1. | on #14 screen | about 36.3% |
| | on #20 screen | about 47.4% |
| | on #25 screen | about 7.6% |
| | on #30 screen | about 4.4% |
| | through a #30 screen | about 4.3% |
| 2. | on #14 screen | about 19.1% |
| | on #20 screen | about 60.7% |
| | on #25 screen | about 13.7% |
| | on #30 screen | about 4.1% |
| | through a #30 screen | about 2.4% |
| 3. | on #14 screen | about 1.8% |
| | on #20 screen | about 74.0% |
| | on #25 screen | about 19.9% |
| | on #30 screen | about 3.8% |
| | through a #30 screen | about 0.5%. |

The larger raw grits particles (larger granulation) result in a more granular and more desirable product which better resembles real cook-up grits. They are, however, more difficult to cook, and require a higher cooking temperature and longer cooking time.

Mixing in step (b) is normally effected for about one minute or slightly less. In addition to admixing, cooking is initiated at this stage.

A typical amount of water being processed through the in-line mixer during step (b) is from about 1.7 to about 2.1 gallons per minute for the size equipment referred to in this text. Insufficient water results in grits which are too viscous to pump to the drum drier and harder grits particles after drying. Too much water makes the grits mixture separate and fall through the drum-drier gap. The water separates and runs out of the bottom of the drier. Excess water also exceeds the ability of the drum drier to remove water. For the drum drier referred to herein processing 4.0 gallons per minute of water through the in-line mixer is the likely theoretical maximum.

The step (b) admixing is preferably conducted in an in-line mixer, e.g. a malaxator. When a malaxator is used, a screw speed of from 50 to 60 rpm is sufficient to achieve adequate mixing without breaking up the grits. Slow speeds (less than 30 rpm) do not seem to provide adequate mixing; faster speeds seem to increase the fines and reduce finished product granulation. Modifying the malaxator to ensure its remaining half full improves mixing; steam is more efficiently mixed into the product. Further efficiency is achieved by restricting the exit to an opening which is just enough to permit the product to leave. Malaxators normally have a dam at the exit end to restrict the product from running out. Excess steam also escapes through the exit.

Typical grits throughput is from 5.4 to 6.6 pounds per minute. The throughput, which is dependent on the relative humidity of the air in an operating plant, is naturally coordinated with the ability of the drum drier to dry. Increasing the throughput beyond that level is nonproductive and results in inadequate water removal. Reducing the throughput unnecessarily reduces production. The actual throughput is dependent on drier-drum size and capacity.

Cooking is effected in steps (b) and (c), as well as while conducting the slurry formed in step (b) to the drier used in step (c). The majority of the cooking (or gelatinization) normally occurs in pipes going to the drier (over a period of up to 11 minutes) and in the pool formed between the drums of the drier or on the drum itself (over a period of up to 2 minutes). In order to achieve the desired flavor and texture, sufficient water, e.g. about 0.320 gallon per pound of grits (not including steam), must be employed. [For 6.25 pounds per minute of grits about 2 gallons of total water (tap water plus salt water) are used.] Cooking is effected at a temperature of from 175° to 210° F. for a period of from about 5 to about 14 minutes. Of this time less than one minute is during step (b) and, possibly, only from 0.45 to 0.7 minute during step (c); the rest of the cooking is effected while conducting the slurry formed in step (b) to the drier used for step (c).

Insufficient water limits starch swelling and results in a "sandy" product that will not rehydrate in hot water. Excess water results in a waste of drying time and energy. Lower temperatures result in a product which is hard and will not rehydrate; higher temperatures waste energy and result in overcooked, mushy instant grits.

Enough steam is added during admixing step (b) to bring the product to the desired mixer exit temperature. Higher temperatures tend to make the cooked grits very viscous and difficult to pump; they also make the finished product soft and viscous after rehydration. Lower temperatures result in a product that is hard in the mouth and which rehydrates slowly. Exit temperatures below 170° F. result in almost no cooking prior to reaching the drier. Grits pregelatinize during step (b) and while being transferred from step (b) to step (c).

The level of cooking is one of the critical parameters. The level is increased by increasing the temperature and/or increasing the depth of the pool between the drying drums. In order to achieve the desired flavor and texture, the product must have enough and a balanced amount of water, temperature and cooking time. Time is needed to allow the starch to swell and soften. The desired time of from five to fourteen minutes is achieved by increasing the input pipe diameter. This also has a side benefit of reducing the pumping pressure and the incidence of clogging.

The slurry obtained from step (b) is dispensed evenly along a drum drier, the drums of which are preferably either chrome plated or of stainless steel. The slurry is advantageously pumped from the in-line mixer to the drum drier through a pipe having a diameter in excess of 2 inches, e.g., a 3-inch diameter pipe. This procedure makes it possible to control the cooking time more easily. By pumping vertically and upwardly, as well as horizontally, and fixing the pipe size, even greater control is available.

The double-drum drier can naturally vary in size, and the throughput is proportionally dependent upon drum surface area. The drums are, e.g., 5 feet in diameter and 12 feet long. They are heated with steam which is optimally at a pressure of from 80 to 85 psi for drums (about feet in diameter) rated at 100 psi or above. Lower steam pressures reduce output by lowering the water removal rate.

The drum gap is from 0.011 to 0.025 (optimally from 0.014 to 0.019) inch. A smaller gap results in a more finely divided powdery product that does not have enough large granules to impart the desired grits mouth feel, but rehydrates faster (resulting in higher viscosity). A larger gap results in a product that does not rehydrate as rapidly, has a lower viscosity, and has a gritty or ball-bearing-like mouth feel.

A drum gap of from 0.014 to 0.017 inch is optimum for larger granule grits, as this produces slight crushing, while speeding drying and rehydration. A gap of 0.019 is slightly preferred for finer granulation grits, as this produces a more granular final product.

As the product sits on the drum in preparation for going through the nip, it continues to cook. A little cooking is good, as it removes water and reduces the amount of steam required, but excess cooking results in soft, mushy grits or even a scorched corn-chip-like flavor.

Adjusting the gap can compensate slightly for overcook or undercook. Crushing an undercooked product speeds rehydration. Widening the gap on an overcooked product reduces fines and viscosity slightly.

Smaller diameter drums appear to dictate wider gaps, possibly due to changes in pumping action. Cooked product viscosity may also alter desirable gap range.

The drum speed is typically from 0.9 to 2.2 rpm and is adjusted to obtain a maximum amount of moisture of from 10 to 10.5 percent, which is desired. A slower speed unnecessarily reduces throughput, whereas faster speeds result in an unstable product that develops an off-odor and flavor, due to microbiological activity and, possibly, oxidation.

After drying, the product is gently transported (e.g., by using mechanical augers and a low velocity air transport system) to suitable equipment for comminution. Breaking up the dried product is optionally effected on any of a number of available types of equipment. A simple mechanical shaker screen is suitable. A hammer mill (Fitzmill or Comill) is more than adequate. When a Fitzmill is used, it is often unnecessary to separate fines. When a blower and screen are used, the product is pulled into a bag house at low pressure. As the pressure is lowered (more vacuum), the air velocity increases to break the grits into finer pieces. Pieces larger than a number seven screen are removed and recirculated through the vacuum system. Pieces smaller than a number forty screen are removed and discarded. More than from 3 to 5 percent fines makes the product excessively starchy and creamy. Normally, excess fines (particularly above 4 percent) are separated out. Fines are more acceptable (up to 10 percent) in a flavored product, to which excess fines can be added.

Tests with instantized grits with a high fat level show them to be unstable, developing a sour, rancid flavor in only two weeks at 100° F. Grits with a fat level at 0.81 percent are stable for 25 days at 120° F. and 80 percent relative humidity.

The final product is improved by dry mixing therewith a small amount (about 0.5 percent by weight) of dry CMC gum, which is sufficient to control product viscosity without imparting excessive slickness.

Flavor, such as sugar, dried cheese powder, synthetic or natural bacon bits and ham-flavored bits; enrichment, such as reduced iron, niacin, thiamine nononitrate and riboflavin; and/or preservative, such as BHA and citric acid (to preserve flavor), is optionally dry mixed with the product prior to packaging.

The invention and its advantages are readily appreciated from the preceding description. Various changes may be made in the process, employed equipment, additives, amounts and conditions without departing from the spirit and scope of the invention or sacrificing its material advantages. The described procedures and products are merely indicative of preferred embodiments.

What is claimed is:

1. A process for preparing instant grits which comprises:
   a) premixing water with at least one member selected from the group consisting of antioxidant, salt and a sugar to obtain a gum-free mixture;
   b) admixing the gum-free mixture with raw grits, additional water, optionally a sugar and/or salt, and enough steam to heat the resulting slurry to a temperature of from 175° to 205° F. (79.5° to 96.1° C.);
   c) drying the gum-free heated slurry on a double-drum drier for a period of about one minute;
   d) breaking up the dried product from step (c);
   e) separating excess fines if needed; and
   f) optionally dry mixing the retained dried product with additional flavor, enrichment, preservative and/or dry CMC.

2. A process of claim 1 wherein the total amount of water admixed with the raw grits is from 150 to 250 percent by weight, based on the weight of the raw grits, and the temperature in step (b) is at least 180° F., which is maintained over a period of at most one minute.

3. A process of claim 2 wherein step (d) is effected on a simple mechanical shaker screen.

4. A process of claim 1 wherein a sugar is included in step (a) or step (b).

5. A process of claim 4 wherein the sugar referred to in step (a) is dextrose, and the amount of dextrose is about 0.5 percent by weight, based on the weight of grits, or less.

6. A process of claim 1 which comprises dispensing the heated slurry from step (b) evenly along the double-drum drier.

7. A process of claim 6 which comprises pumping said heated slurry vertically upward and allowing grits therein to pregelatinize before dispensing the slurry on the double-drum drier.

8. A process of claim 7 wherein the vertically-upward pumping is effected through a pipe having a diameter in excess of 2 inches.

9. A process of claim 3 which comprises gently transporting the dried product from step (c) to the shaker screen.

10. A process of claim 9 which comprises using mechanical augers and a low-velocity air transport system to conduct the dried product to the shaker screen.

11. A process of claim 1 wherein the slurry of step (b) comprises about 0.320 gallon of water per pound (about 2.67 liters per kilogram) of grits.

12. A process of claim 1 which comprises maintaining the slurry of step (b) at the noted temperature for a period of from about 5 to about 11 minutes before drying it on the double-drum drier.

13. A process of claim 1 wherein the retained dried product of step (d) has a fat level at or below 0.8 percent by weight.

14. A process of claim 1 wherein the amount of dry CMC referred to in step (f) is at most about 0.5 percent by weight.

15. A process of claim 1 wherein the double-drum drier has a drum gap of from 0.016 to 0.019 inch.

16. A process of claim 14 wherein the grits are larger-granule grits and the drum gap is from 0.014 to 0.017 inch.

17. A process of claim 14 wherein the grits are finer-granule grits and the drum gap is about 0.019 inch.

18. A process of claim 1 wherein the raw grits have a particle size distribution as reflected by the following table:

| | |
|---|---|
| on #14 screen | about 36.3% |
| on #20 screen | about 47.4% |
| on #25 screen | about 7.6% |
| on #30 screen | about 4.4% |
| through a #30 screen | about 4.3% |

19. A process of claim 1 wherein the raw grits have a particle size distribution reflected by the following table:

| | |
|---|---|
| on #14 screen | about 1.8% |
| on #20 screen | about 74.0% |
| on #25 screen | about 19.9% |
| on #30 screen | about 3.8% |
| through a #30 screen | about 0.5%. |

20. A process of claim 1 wherein the raw grits have a particle size distribution as reflected by the following table:

| | |
|---|---|
| on #14 screen | about 19.1% |
| on #20 screen | about 60.7% |
| on #25 screen | about 13.7% |
| on #30 screen | about 4.1% |
| through a #30 screen | about 2.4%. |

21. A process of claim 1 for preparing emulsifier-free instant grits.

22. A process of claim 1 wherein the drying period of step (c) is from 0.45 to 0.7 minute.

23. A process for preparing instant grits which comprises admixing a gum-free aqueous admixture with raw grits and, optionally, antioxidant, sugar and/or salt, additional water and enough steam to heat the resulting slurry to a temperature of from 175° to 205° F., drying the gum-free heated slurry on a double-drum drier for less than one minute, breaking up the thus-dried product, separating out any excess fines, and, optionally, dry mixing the retained dried product with additional flavor, enrichment, preservative and/or dry CMC.

24. Gum-free instant grits having a fat level of at most 0.9 percent by weight and a grits particle size distribution within the weight range reflected by the following table:

| | |
|---|---|
| on #14 screen | from 1 to 37 percent |
| on #20 screen | from 47 to 74 percent |
| on #25 screen | from 7 to 20 percent |
| on #30 screen | from 3 to 5 percent |
| through a #30 screen | from <1 to 5 percent |

25. Gum-free instant grits of claim 24 comprising a sheet formation enhancing amount of a sugar or sugar-like material.

26. Gum-free instant grits of claim 25 wherein the amount of sugar or sugar-like material is less than 2 percent by weight, based on the weight of the raw grits.

27. A composition which comprises gum-free instant grits of claim 25 in admixture with up to about 0.5 percent by weight of dry CMC gum.

28. A composition of claim 27 wherein the gum-free instant grits comprise a sheet formation enhancing amount of dextrose.

29. A process of claim 23 which consists essentially of admixing a gum-free aqueous admixture with raw grits and enough steam to heat the resulting slurry to a temperature of from 175° to 205° F., drying the gum-free heated slurry on a double-drum drier for less than one minute, breaking up the thus-dried product, and separating out any excess fines.

30. Gum-free instant grits of claim 24 comprising from 0.45 to about 3% by weight of a sugar or sugar-like material.

* * * * *